United States Patent [19]

Garden

[11] 3,867,343

[45] Feb. 18, 1975

[54] CATALYSTS AND USE THEREOF

[75] Inventor: William David Garden, Manchester, England

[73] Assignee: Imperial Chemical Industries Limited, London, England

[22] Filed: Oct. 30, 1973

[21] Appl. No.: 411,166

[30] Foreign Application Priority Data
Dec. 11, 1972 Great Britain.................... 56992/72

[52] U.S. Cl... 260/46.5 UA, 252/431 N, 252/431 P, 260/46.5 G, 260/46.5 A, 260/448.2 E, 260/825
[51] Int. Cl. ............................................ C08f 11/04
[58] Field of Search .................... 252/431 N, 431 P; 260/448.2 E, 46.5 UA, 46.5 G, 46.5 H, 825

[56] References Cited
UNITED STATES PATENTS

| | | | |
|---|---|---|---|
| 3,188,299 | 6/1965 | Chalk.......................... | 260/46.5 UA |
| 3,344,111 | 9/1967 | Chalk.......................... | 260/46.5 UA |
| 3,453,233 | 7/1969 | Flatt............................. | 260/46.5 G |
| 3,467,685 | 9/1969 | Milbert et al.................. | 260/448.2 |
| 3,723,567 | 3/1973 | Mink............................ | 260/46.5 G |

*Primary Examiner*—Melvyn I. Marquis
*Attorney, Agent, or Firm*—Cushman, Darby & Cushman

[57] ABSTRACT

New catalysts consisting of a platinum complex and ammonia or derivative thereof, use of such catalysts to confer longer bath lives on compositions containing siloxanes containing SiOH groups and siloxanes containing SiH groups and solventless catalysed compositions.

8 Claims, No Drawings

CATALYSTS AND USE THEREOF

This invention relates to new and improved catalysts and to the use thereof.

Organic complexes of platinum are well known and have been widely used as catalysts for a number of reactions including that between compounds containing one or more silicon-bonded hydrogen atoms and compounds containing one or more silicon-bonded hydroxy groups. Unfortunately while these platinum complexes are very effective catalysts for compositions containing such compounds the bath life of such catalysed compositions is frequently undesirably short.

We have now found that the addition of certain N-containing compounds to the platinum complex catalyst gives an improved bath life without derogating from the catalytic action of the platinum complex at the reaction temperature.

According to the present invention a new and improved catalyst comprises an organic platinum complex and ammonia or a derivative of ammonia in which the three valences are satisfied by bonding to an atom from the group C, H, O, N or Si provided that not more than one O atom is bonded to the ammonia N atom, the ammonia or derivative thereof being present in amount such that the atomic ratio of Pt to the ammonia N atom is from 10:1 to 1:1000.

Our invention also resides in a composition comprising a compound having one or more silicon-bonded hydrogen atoms, a compound having one or more silicon-bonded hydroxyl groups, an organic platinum complex in amount from $1 \times 10^{-5}$ to $1 \times 10^{-2}$ g. atoms Pt per Kg of total silicon compounds and ammonia or a derivative of ammonia in which the three valences are satisfied by bonding to an atom from the group C, H, O, N and Si provided that not more than one O atom is bonded to the ammonia N atom, the ammonia or derivative thereof being present in amount such that the atomic ratio of Pt to the N atom is from 10:1 to 1:1000.

An organic complex of platinum, hereinafter referred to as a "platinum catalyst," is a compound of platinum containing one or more ligand or donor groups. Suitable ligand or donor groups include groups containing arsenic, phosphorus, sulphur, or nitrogen, or an olefin, which can donate electrons to form a bond with the platinum metal. Suitable ligands include the hydrocarbyl arsines, phosphines, and sulphides such as tripropyl arsine, tributyl phosphine, or diethyl sulphide, nitriles such as benzonitrile, olefins such as ethylene, cyclohexene, hexa-1:5-diene and 2-dimethyl-5-methylhex-3-yne; and amines such as ammonia, pyridine and ethylenediamine. These platinum catalysts can be prepared by methods described, for example, by Kharasch, J.A.C.S., 1936, 58, 1733, or MacNevin, Giddings and Foris, Chemistry and Industry 1958, 657, or in "Inorganic Synthesis," Vol. 6, p. 211 (McGraw & Hill, N.Y. 1960).

Suitable platinum catalysts include; for example bis-(benzonitrile)dichloroplatinum, bis(tributylphosphine) dibromoplatinum, (tributylphosphine)(triphenylphosphine)di-iodoplatinum, bis-(phenyldimethylphosphine) triphenylsilyl chloroplatinum, bis-(phenyldimethylphosphine) diphenylmethylgermanyl chloroplatinum, bis(tripropylphosphine) dichloro-$\mu$-dichlorodiplatinum, bis-(tripropylphosphine) dichloro-$\mu$-bis(ethylmercaptyl) diplatinum, bis(diethylsulphide) dichloroplatinum, bis(trimethylphosphine) methylbromoplatinum, bis(tripropylarsine) dichloroplatinum, bis(triphenylphosphine) dimethyl platinum, triethylphosphine ethylene dichloroplatinum and cyclohexene dichloroplatinum.

The derivatives of ammonia used in our invention include primary, secondary and tertiary amines such as n-propylamine, di-n-propylamine, tri-n-propylamine, morpholine, and N,N,N',N' -tetramethylethylenediamine; heterocyclic compounds such as pyridine, quinoline, bipyridyl, aminopyridine, aminopyrimidine, iminazole, and pyrrole, amides such as propionamide, acrylamide, formamide and dimethylformamide; azo compounds such as azobenzene; hydrazides such as benzhydrazide; nitriles such as acetonitrile, acrylontrile and adiponitrile; hydroxylamines such as diethylhydroxylamine, oximes such as dimethylglyoxime, nitroso compounds such as $\alpha$-nitroso-$\beta$-naphthol, p-nitrosodiphenylamine and N-nitrosodiphenylamine; siloxanes such as polymethyl ($\beta$-dimethylaminoethoxy) siloxane; and silazanes such as hexamethyldisilazane.

While the ammonia of derivative thereof is used in amount such that the atomic ratio of Pt to the ammonia N-atom is from 10:1 to 1:1000 it is in many cases preferred that it be in the range 1:1 to 1:100. In the catalysts of our invention the ammonia or ammonia derivatives may be dissolved or dispersed in a suitable solvent and the solution then mixed with a solution of the platinum catalyst. Alternatively the ammonia or derivative thereof may be dissolved or dispersed directly in the solution of the platinum catalyst without the addition of further solvent.

In the case of the compositions of our invention the two constituents of the catalyst of our invention need not be mixed before addition to the silicon compounds. In many cases it is in fact convenient to add them separately. Thus the ammonia or ammonia derivative may be added alone or in a small amount of solvent either before or after addition of the platinum catalyst which for convenience is usually dissolved in a small amount of solvent.

A preferred type of composition of our invention is that in which the silicon compounds are of the kind widely used in conventional processes for the application of non-adherent polysiloxane coatings to paper or for the application of water-repellent polysiloxanes to textiles. These compositions normally contain a silicon compound containing silicon-bonded hydrogen atoms in the form of an organohydrogenpolysiloxane, frequently a methylhydrogenpolysiloxane, and a silicon compound containing silicon-bonded hydroxyl groups in the form of an $\alpha,\omega$-dihydroxy diorganopolysiloxane, frequently a hydroxy-ended dimethyl polysiloxane. In these compositions there is normally present a considerable proportion of a solvent. In such compositions according to our invention it is quite unnecessary to use any solvent other than the very small amount introduced with the catalyst. This gives the great advantage of accelerating the process in that the time formerly needed to volatilise off the solvent after application of the composition to the substrate and before curing can take place is not necessary. In the hitherto available compositions it has not been possible to omit the solvent since this always resulted in a very considerable shortening of the bath life of the catalysed composition.

The catalysts of our invention increase the bath life and decrease the cure time of the compositions of our invention compared with those of the hitherto available compositions. This can be shown by measuring the catalyst temperature coefficient. This is a ratio which can be used to characterise the behaviour of a catalyst in a system where the bath life and cure time is and cure time is related as is the case with these compositions.

Catalyst temperature coefficient =

$$\frac{\text{Time for gelation of catalysed composition at ambient temperature}}{\text{Time for cure of catalysed composition at curing temperature}}$$

Our invention is further illustrated by the following examples in which all parts and percentages are by weight.

EXAMPLES 1 – 23

Determination of Catalyst Temperature Coefficients

1. A polysiloxane composition was prepared by mixing 92 parts of a hydroxy-ended polydimethylsiloxane of viscosity 140 cP at 20°C with 8 parts of a polymethylhydrogensiloxane of viscosity 20 cP at 20°C and Me/Si and H:SI ratios of 1:1. To this composition was added ammonia, or ammonia derivative followed by platinum catalyst. 2. A portion of the catalysed polysiloxane composition was placed in a container maintained at 25°C and a stainless steel plunger immersed in the composition. The plunger consisted of a circular plate ⅞ inch in diameter with a 4 inch × ⅛ inch diameter stem joined to its centre. The plunger weighed 6.2 g and was oscillated mechanically in a vertical direction with an amplitude of ½ inch and a frequency of 1 cycle per minute by a 'Tecam Gelation Timer' (manufactured by Techne Ltd., Cambridge, England). When the polysiloxane composition gelled the movement of the plunger was inhibited whereupon the Gelation Timer automatically cut out. The time in minutes for which the Gelation Timer was in operation, i.e. the 'gel time,' was recorded.

3. A portion of the catalysed polysiloxane composition was applied to vegetable parchment paper at a coat weight of 7 g/m² and the coated paper placed in an air-circulated oven at 140°C. The minimum time required for the coating to cure to a non-smearing elastomeric solid is known as the 'cure time.'

In these examples an ammonia derivative was added to the polysiloxane composition in the form of a toluene solution containing a small proportion of either acetone or 74 op. industrial methylated spirits at a concentration of 1/10 g. atom or N per litre. The proportion of ammonia derivative in the polysiloxane compositions was equivalent to 1/1000 g. atom N per kg. of polysiloxanes.

The platinum catalyst used was a solution of bis(-diethylsulphide) dichloroplatinum in toluene at a concentration of 1/10 mole per litre. The concentration of platinum in the polysiloxane composition was 1/1000 g. atom Pt per kg. The cure time was determined ½ hour after addition of the platinum catalyst.

| Example | Ammonia derivative | Cure time (Secs.) | Gel time (mins.) | Catalyst Temp. Coefficient |
|---|---|---|---|---|
| Control | Nil | 22 | 225 | 613 |
| 1 | NNN'N' tetramethylethylenediamine | 35 | 1533 | 2630 |
| 2 | trimethylamine | 28 | 1666 | 3570 |
| 3 | pyridine | 26 | 1243 | 2870 |
| 4 | * polymethyl(β-dimethylaminoethoxy)-siloxane | 36 | 1267 | 2110 |
| 5 | hexamethyl-disilazane | 25 | 458 | 1100 |
| 6 | dimethylformamide | 26 | 1792 | 4140 |
| 7 | hexamethylenetetramine | 25 | 434 | 1040 |
| 8 | iminazole | 35 | 874 | 1500 |
| 9 | 2-aminopyridine | 34 | 2229 | 3940 |
| 10 | n-propylamine | 30 | 978 | 1960 |
| 11 | tert-butylamine | 30 | 842 | 1680 |
| 12 | acrylamide | 25 | 705 | 1690 |
| 13 | formamide | 30 | 837 | 1670 |
| 14 | benzhydrazide | 28 | 600 | 1290 |
| 15 | 2-furfurylamine | 27 | 753 | 1680 |
| 16 | diphenylamine | 18 | 217 | 722 |
| 17 | morpholine | 30 | 1060 | 2120 |
| 18 | diphenylthiocarbazone | 30 | 492 | 980 |
| 19 | α-dipyridyl | 35 | 2409 | 4140 |
| 20 | diethylhydroxylamine | 34 | 963 | 1700 |
| 21 | N-nitrosodiphenylamine | 10 | 244 | 1464 |
| 22 | p-nitrosophenol | 16 | 226 | 846 |
| 23 | allylamine | 22 | 716 | 1950 |

* Prepared by reacting the polymethylhydrogensiloxane used in Example 1 with an equimolar proportions of β-dimethylaminoethanol.

The above examples show that the Catalyst Temperature Coefficient is always increased and that in general the bath life of a polysiloxane composition can be considerably increased without significantly affecting the initial cure time. Moreover the following figures with reference to the above examples illustrate that the cure time of a polysiloxane composition containing a derivative of ammonia is not adversely affected as the composition ages.

| Example | Minimum cure at a bath life of 20 hrs. (secs.) |
|---|---|
| 1 | 32 |
| 2 | 12 |
| 3 | 18 |
| 9 | 13 |

EXAMPLES 24–36

In examples 27, 28, 29, 32 and 33, the N-containing compound was added to the polysiloxane composition without first dissolving it in solvent. The platinum catalyst used was the same as in Example 1.

| Example | Ammonia or Derivative | Conc. in solvent | Proportion per kg polysiloxanes | Cure Time (secs.) | Gel Time (mins.) | Catalyst Temperature Coefficient |
|---|---|---|---|---|---|---|
| 24 | Ammonia | 1 g.atom N/l | 1/100 g.atom N | 28 | 946 | 2030 |
| 25 | benzhydrazide | 1.5 g.atom N/l | 1/500 g.atom N | 27 | 2572 | 5710 |
| 26 | acrylonitrile | 1 g.atom N/l | 1/100 g.atom N | 21 | 335 | 957 |
| 27 | acrylonitrile | — | 1/10 g.atom N | 21 | 1419 | 4050 |
| 28 | acrylonitrile | — | 1/2 g.atom N | 21 | 4291 | 12280 |
| 29 | acetonitrile | — | 1/10 g.atom N | 23 | 312 | 814 |
| 30 | dimethylgyloxime | 2/5 g.atom N/l | 2/500 g.atom N | 30 | >2560 | >5120 |
| 31 | α-nitroso-β-naphthol | 1/5 g.atom N/l | 1/500 g.atom N | 14 | 692 | 2970 |
| 32 | diazoaminobenzene | 3 g.atom N/l | 3/100 g.atom N | 20 | >1400 | >4200 |
| 33 | benzonitrile | — | 1/10 g.atom N | 27 | 329 | 731 |
| 34 | azobenzene | 1 g.atom N/l | 1/100 g.atom N | 16 | 245 | 918 |
| 35 | p-nitrosodiethyl-aniline | 1 g.atom N/l | 1/100 g.atom N | 34 | >1040 | >1835 |
| 36 | N-nitroso-N-methyl-p-toluene-sulphonamide | 1/2 g.atom N/l | 1/200 g.atom N | 16 | 167 | 626 |

EXAMPLES 37–52

In these Examples different types of catalyst were used. For convenience the platinum catalyst was dissolved in a suitable solvent and 1 part of this solution added to 100 parts of the polysiloxane composition. The ammonia derivatives were dissolved and dispersed in the same way.

In the Table below the data for the catalysed polysiloxane composition are presented opposite the name of the platinum catalyst and the data for a similar catalysed composition with the addition of the ammonia derivative are presented opposite the name of the ammonia derivative. In Examples 43, 49 and 50 the cure time was determined at a bath life of 10 minutes.

| Example | Catalyst/Ammonia derivative | Proportion per kg polysiloxanes | Cure Time (secs.) | Gel Time (mins.) | Catalyst Temp. Coefficient |
|---|---|---|---|---|---|
| 37 | bis(triethylphosphine)dichloroplatinum | 1/5000 g.atom Pt. | 50 | 140 | 168 |
|    | dimethylformamide | 1/5000 g.atom N | 50 | 516 | 620 |
| 38 | bis(tripropylphosphine)dibromo-μ-dibromo diplatinum | 1/5000 g.atom Pt | 90 | 689 | 459 |
|    | dimethylformamide | 1/5000 g.atom N | 45 | 383 | 510 |
| 39 | bis(tripropylphosphine)dichloro-μ-bis (ethylmercaptyl)diplatinum | 1/1000 g.atom Pt | 30 | 480 | 960 |
|    | dimethylformamide | 1/1000 g.atom N | 90 | 1620 | >1080 |
| 40 | bis(tripropylphosphine)di-iodo-μ-di-iodo-diplatinum | 1/5000 g.atom Pt | 180 | 155 | 52 |
|    | dimethylfromamide | 1/5000 g.atom N | 180 | 1280 | 426 |
| 41 | bis(diethylsulphide)dichloro-μ-dichloro diplatinum | 1/10,000 g.atom Pt | >300 | 383 | <77 |
|    | diphenylamine | 1/1000 g.atom N | >270 | 427 | 95 |
| 42 | bis(trimethylphosphine)methylbromo-platinum | 1/5000 g.atom Pt. | 50 | 1800 | 2160 |
|    | diphenylamine | 1/1000 g.atom N | 40 | 2769 | 4150 |
| 43 | bis(tripropylarsine)dichloroplatinum | 1/5000 g.atom Pt | 60 | 11 | 11 |
|    | *dimethylglyoxime | 1/2500 g.atom N | 75 | 106 | 85 |
| 44 | bis(benzonitrile)dichloroplatinum | 1/10,000 g.atom Pt. | 135 | 515 | 229 |
|    | N-nitrosodiphenylamine | 1/500 g.atom N | 75 | 570 | 456 |
| 45 | bis(benzonitrile)dichloroplatinum | 1/10,000 g.atom Pt. | 135 | 515 | 229 |
|    | ammonium salt of N-nitrosophenylhydroxy-lamine | 1/2000 mol. | 150 | >2870 | >1148 |
| 46 | cyclohexene dichloroplatinum | 1/10,000 g.atom Pt | 75 | 181 | 145 |
|    | diphenylamine | 1/5000 g.atom N | 75 | 288 | 231 |
| 47 | bis(2-dimethyl-5-methylhex-3-yne) dichloro-μ-dichlorodiplatinum | 1/10,000 g.atom Pt | 60 | 120 | 120 |
|    | dimethylformamide | 1/10,000 g.atom N | 45 | 2752 | 3670 |
| 48 | bis(triethylphosphine)dichloroplatinum | 1/5000 g.atom Pt | 50 | 140 | 168 |
|    | 2-aminopyridine | 1/1000 g.atom N | 50 | 5774 | 6930 |
| 49 | bis(triphenylphosphine)dimethylplatinum | 1/5000 g.atom Pt | 60 | 32 | 32 |
|    | *trimethylamine | 1/1000 g.atom N | 35 | 21 | 36 |
| 50 | bis(triphenylphosphine)diphenylplatinum | 1/5000 g.atom Pt | 60 | 25 | 25 |
|    | *benzhydrazide | 1/1000 g.atom N | 60 | 54 | 54 |
| 51 | bis(triphenylphosphine)dimethylplatinum | 1/5000 g.atom Pt | 60 | 32 | 32 |
|    | α'-dipyridyl | 1/1000 g.atom N | 60 | 101 | 101 |
| 52 | bis(dimethylphenylphosphine) (triphenylsilyl)chloroplatinum | 1/1000 g.atom Pt | 45 | 149 | 199 |
|    | dimethylformamide | 1/1000 g.atom N | 35 | >1020 | >1750 |

*Cure time determined at a bath life of 10 minutes.

What we claim is:
1. A composition comprising an organohydrogenpolysiloxane, an α-ω-dihydroxydiorganopolysiloxane and a catalyst consisting of an organic platinum complex in which the ligand or donor groups are selected from the group consisting of groups containing arsenic, phosphorus, sulphur or nitrogen and olefins, said groups being capable of donating electrons to form a bond with platinum, and a nitrogen compound selected from the group consisting of ammonia and derivatives of ammonia in which the three valences are satisfied by bonding to an atom selected from the group consisting of C, H, O, N and Si provided that not more than one O atom is bonded to the ammonia N atom, the ammonia or derivative thereof being present in amount such that the atomic ratio of P$t$ to the ammonia N atom is from 10:1 to 1:1000 and the organic platinum complex being present in amount from $1 \times 10^{-5}$ to $1 \times 10^{-2}$ g. atoms Pt per 1 Kg of total polysiloxanes.

2. A composition according to claim 1 wherein the organo groups in either or both of the polysiloxanes are methyl groups.

3. A composition according to claim 1 wherein an ammonia derivative is used and is a primary, secondary or tertiary amine, a heterocyclic compound, an amide, an azo compound, a hydrazide, a nitrile, a hydroxylamine, an oxime, a nitroso compound, an aminosiloxane or a silazane.

4. A composition according to claim 1 wherein the ligand or donor group is a hydrocarbyl arsine, phosphine or sulphide, a nitrile or an amine.

5. A composition according to claim 4 wherein the ligand or donor group is tripropyl arsine, tributyl phosphine, diethyl sulphide, benzonitrile, ethylene, cyclohexene, hexa-1,5-diene, 2-dimethyl-5-methylhex-3-yne, ammonia, pyridine or ethylenediamine.

6. A composition according to claim 1 wherein the organic platinum complex is bis-(benzonitrile)dichloroplatinum, bis(tributylphosphine) dibromoplatinum, (tributylphosphine)(triphenylphosphine) diiodoplatinum, bis-(phenyldimethylphosphine) triphenylsilyl chloroplatinum, bis-(phenyldimethylphosphine) diphenylmethylgermanyl chloroplatinum, bis(tripropylphosphine) dichloro-μ-dichlorodiplatinum, bis-(tripropylphosphine) dichloro-μ-bis(ethylmercaptyl) diplatinum, bis(diethylsulphide) dichloroplatinum, bis(trimethylphosphine) methylbromoplatinum, bis(tripropylarsine) dichloroplatinum, bis(triphenylphosphine) dimethyl platinum, triethylphosphine ethylene dichloroplatinum or cyclohexene, dichloroplatinum.

7. A composition according to claim 3 wherein the ammonia derivative is n-propylamine, di-n-propylamine, tri-n-propylamine, morpholine, N,N,N',N'-tetramethylethylenediamine, pyridine, quinoline, bipyridyl, aminopyridine, aminopyrimidine, iminazole, pyrrole, propionamide, acrylamide, formamide, dimethylformamide, azobenzene, benzhydrazide, acetonitrile, adiponitrile, diethylhydroxyamine, dimethylglyoxime, α-nitroso-β-naphthol, p-nitrosodiphenylamine, N-nitrosodiphenylamine, a polymethyl(β-dimethylaminoethoxy)siloxane or hexamethyldisilazane.

8. A composition according to claim 1 wherein the atomic ratio of P$t$ to the ammonia N-atom is from 1:1 to 1:100.

* * * * *